(12) United States Patent
Krajc

(10) Patent No.: US 11,214,191 B2
(45) Date of Patent: Jan. 4, 2022

(54) FASTENING DEVICE FOR A VEHICLE LAMP UNIT, LAMP UNIT FOR A VEHICLE, AND VEHICLE

(71) Applicant: Bayerische Motoren Werke Aktiengesellschaft, Munich (DE)

(72) Inventor: Thorsten Krajc, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/822,421

(22) Filed: Mar. 18, 2020

(65) Prior Publication Data

US 2020/0215965 A1    Jul. 9, 2020

Related U.S. Application Data

(63) Continuation of application No. PCT/EP2018/076017, filed on Sep. 25, 2018.

(30) Foreign Application Priority Data

Nov. 9, 2017    (DE) .................... 10 2017 219 904.0

(51) Int. Cl.
*B60Q 1/26*    (2006.01)
*B60Q 1/30*    (2006.01)

(52) U.S. Cl.
CPC ......... *B60Q 1/2623* (2013.01); *B60Q 1/2653* (2013.01); *B60Q 1/30* (2013.01)

(58) Field of Classification Search
CPC ... B60Q 1/2623; B60Q 1/2626; B60Q 1/2653
See application file for complete search history.

(56) References Cited

U.S. PATENT DOCUMENTS

| | | | | |
|---|---|---|---|---|
| 2,138,076 A | * | 11/1938 | Taylor | B60Q 1/0683 362/372 |
| 5,975,733 A | * | 11/1999 | Gonzalez Gallegos | B60Q 1/2626 362/306 |
| 2005/0135111 A1 | * | 6/2005 | King | B60Q 1/2626 362/524 |

FOREIGN PATENT DOCUMENTS

| | | | | |
|---|---|---|---|---|
| DE | 3426711 A1 | * | 1/1986 | ........ B60Q 1/2623 |
| DE | 197 35 731 A1 | | 3/1998 | |
| DE | 197 07 949 C1 | | 8/1998 | |
| DE | 198 08 911 A1 | | 9/1999 | |
| DE | 198 13 596 A1 | | 9/1999 | |
| DE | 19813596 A1 | * | 9/1999 | ........... B60R 11/00 |
| DE | 10 2007 006 257 A1 | | 8/2008 | |
| DE | 102012005104 A1 | * | 9/2013 | ........... B62D 65/16 |
| EP | 2123513 A1 | * | 11/2009 | ........ B60Q 1/2623 |
| FR | 2658137 A1 | * | 8/1991 | ............. B60Q 1/30 |
| FR | 2742820 A1 | * | 6/1997 | ........ B60Q 1/2653 |
| FR | 2 753 147 A1 | | 3/1998 | |

(Continued)

OTHER PUBLICATIONS

DE102012005104A1 English machine translation.*

(Continued)

*Primary Examiner* — Alexander K Garlen
(74) *Attorney, Agent, or Firm* — Crowell & Moring LLP

(57) ABSTRACT

A fastening device fastens a lamp unit on a vehicle. The fastening device allows the lamp unit to be fastened to a body part of the vehicle. A lamp unit for the vehicle has a lamp member and a fastening device for fastening the lamp unit to a body part of the vehicle.

19 Claims, 3 Drawing Sheets

(56) References Cited

FOREIGN PATENT DOCUMENTS

WO      WO 98/38063 A1    9/1998
WO      WO 2013/054208 A1    4/2013

OTHER PUBLICATIONS

International Search Report (PCT/ISA/210) issued in PCT Application No. PCT/EP2018/076017 dated Jan. 4, 2019 with English translation (six pages).
Japanese-language Written Opinion (PCT/ISA/237) issued in PCT Application No. PCT/EP2018/076017 dated Jan. 4, 2019 (five pages).
German-language Search Report issued in German Application No. 10 2017 219 904.0 dated Jun. 6, 2018 with partial English translation (11 pages).

\* cited by examiner

FASTENING DEVICE FOR A VEHICLE LAMP UNIT, LAMP UNIT FOR A VEHICLE, AND VEHICLE

CROSS REFERENCE TO RELATED APPLICATIONS

This application is a continuation of PCT International Application No. PCT/EP2018/076017, filed Sep. 25, 2018, which claims priority under 35 U.S.C. § 119 from German Patent Application No. 10 2017 219 904.0, filed Nov. 9, 2017, the entire disclosures of which are herein expressly incorporated by reference.

BACKGROUND AND SUMMARY OF THE INVENTION

The present invention relates to a fastening device for a lamp unit of a vehicle, wherein the lamp unit can be fastened to a body portion of the vehicle by means of the fastening device. The present invention further relates to a lamp unit for a vehicle having a lamp body and a fastening device for fastening the lamp unit to a body portion of the vehicle. Moreover, the present invention relates to a vehicle having a lamp unit.

Lamp units are indispensable components of modern vehicles. Such lamp units of vehicles can take the form, for example, of headlights, direction indicators, brake lights, rear lights or of a combination thereof. It is known in principle to fasten these lamp units to the vehicle, in particular to body portions of the vehicle. Examples of fastening types that can be used are screwing or hooking the lamp unit behind the body portion of the vehicle.

Depending on the fastening type used, there can particularly result limitations which have to be taken into consideration when planning and constructing the lamp unit or the entire vehicle or which limit flexibility and design freedom during planning and construction. Particularly on account of the installation space requirement required by the selected fastening type, arbitrary, free and flexible planning and construction of the lamp unit can be limited. For example, a screw connection of the lamp unit to the body portion of the vehicle requires the presence of corresponding counter-screwing elements. Overall, there can thus occur limitations in the construction freedom of the lamp units of vehicles which are imposed in particular by the known fastening types or devices.

It is therefore an object of the present invention to at least partially overcome the above-described disadvantages in the case of fastening devices for lamp units of vehicles, in the case of lamp units of vehicles and in the case of vehicles. In particular, it is an object of the present invention to provide a fastening device, a lamp unit and a vehicle which, in a simple and cost-effective manner, allow the lamp unit to be fastened in or on the vehicle in an as flexible and/or space-saving manner as possible, with in particular demands placed on matching configurations of a body portion of the vehicle and a needed installation space requirement being reduced.

The aforementioned object is achieved by a fastening device for a lamp unit of a vehicle, by a lamp unit for a vehicle and by a vehicle having the lamp unit, in accordance with the claimed invention. Further features and details of the invention will emerge from the dependent claims, the description and the drawings. Features and details here that are described in conjunction with the fastening device according to the invention also apply of course in conjunction with the lamp unit according to the invention and the vehicle according to the invention, and vice versa in each case, so that reference is or can always be made reciprocally with respect to the disclosure of the individual aspects of the invention.

According to a first aspect of the invention, the object is achieved by a fastening device for a lamp unit of a vehicle, wherein the lamp unit can be fastened to a body portion of the vehicle by means of the fastening device. A fastening device according to the invention is characterized in that the fastening device has a clamping portion for generating a clamping force in a clamping direction between a lamp body of the lamp unit and the body portion, and a supporting portion which is mechanically fixedly connected to the clamping portion and intended for clamping the body portion of the vehicle between the lamp body and the fastening device by means of the generated clamping force.

A fastening device according to the invention is provided for securely fastening a lamp unit of a vehicle to a body portion of the vehicle. Fastening is provided by the fastening device according to the invention in particular by a lamp body of the lamp unit being braced relative to a body portion of the vehicle. For such bracing, the fastening device according to the invention is designed to exert or generate a clamping force. To generate it, the fastening device particularly has a clamping portion which can be particularly preferably supported on the lamp body of the lamp unit and generates the clamping force in this way, for example by means of an at least to some extent present relative movement of the clamping portion with respect to the lamp body of the lamp unit. A supporting portion, which is in particular mechanically fixedly connected to the clamping portion, allows this clamping force to be transmitted and in particular to be introduced into the body portion. In particular, a fastening device according to the invention is designed in such a way that it is possible, by means of the generated clamping force, for a body portion of the vehicle to be clamped in between the lamp body and the fastening device, in particular the supporting portion of the fastening device. In other words, the fastening device can preferably be designed in such a way that, in the mounted state of the lamp unit, at least part of the lamp body is arranged on an outer side of the body portion, and the supporting portion of the fastening device according to the invention is arranged on an inner side of the body portion. The clamping force then causes the lamp body to be pulled in the direction of the body portion, with the body portion being clamped in between the lamp body and the fastening device according to the invention by means of the supporting portion. The mechanically fixed connection between the clamping portion and the supporting portion particularly makes it possible here to ensure effective force transmission of the clamping force generated by the clamping portion via the supporting portion to the body portion of the vehicle. Secure and positionally stable fastening of the lamp unit to the body portion of the vehicle can be provided in this way. The clamping force generated by the clamping portion can be particularly preferably generated in a clamping direction which is often formed transversely or at least substantially transversely to a surface of the lamp unit. It is possible in this way to provide clamping of the entire lamp unit particularly with respect to a periphery of the lamp unit.

In summary, a lamp unit of a vehicle can be fastened to a body portion of the vehicle by means of a fastening device according to the invention by virtue of the fact that a clamping portion of the fastening device generates a clamping force by means of which the body portion of the vehicle is clamped in between a supporting portion of the fastening device and the lamp body. In other words, such a fastening device can in particular also be referred to as a clamping claw. The pure clamping of the body portion between the lamp body of the lamp unit and the supporting portion of the fastening device means that no counter-fastening devices, such as screw receptacles, for example, have to be provided on the body portion. A particularly simple and nevertheless secure fastening of a lamp unit of a vehicle can be provided in this way. Limitations in construction and/or planning of the lamp unit that arise on account of fastening devices, such as screw connections, for example, can also be avoided by simple adaptation of the geometric design of a fastening device according to the invention that is based on pure clamping of the lamp unit of the vehicle on the vehicle.

With particular preference, there can be provision in a fastening device according to the invention that the clamping portion has a clamping means and a clamping receptacle for receiving the clamping means for generating the clamping force, wherein in particular the clamping means takes the form of a clamping screw having a clamping nut, and the clamping portion has a supporting surface for the clamping nut arranged on the clamping screw. Such a clamping means which is arranged in a clamping receptacle allows the clamping force required for fastening the lamp unit to be generated in a particularly simple manner. In particular a clamping means taking the form of a clamping screw and having a clamping nut makes it possible, for example by turning the clamping nut on the clamping screw, for said nut to be moved to such an extent that it contacts the supporting surface on the clamping portion and thereby generates the clamping force. Particularly simple and in particular also adjustable generation of the clamping force can be provided in this way.

Moreover, there can be provision in a fastening device according to the invention that the clamping portion is arranged centrally or at least substantially centrally in the fastening device. In this way, the generation of the clamping force can likewise be provided centrally or at least substantially centrally with respect to the entire fastening device. A particularly uniform distribution of the clamping force over the entire fastening device and hence in particular also with respect to the supporting portion via which the clamping force is introduced into the body portion of the vehicle is made possible. Particularly good and in particular uniform bracing of the lamp unit against the body portion of the vehicle can be made possible in this way.

Moreover, a fastening device according to the invention can be designed to the effect that the supporting portion has, along or at least substantially along the clamping direction, at least one support foot, in particular four support feet, for engaging laterally around the lamp body. Particularly good dissipation of the clamping force, starting from the generation of the clamping force at the clamping portion, via the support feet into the body portion can be provided by means of such support feet. The fact that the at least one support foot engages around the lamp body particularly allows the clamping portion also to be able to be arranged centrally or at least substantially centrally with respect to the lamp unit. As a result, the advantages described above in relation to a central or at least substantially central arrangement of the clamping portion with respect to the remainder of the fastening device can be increased further still. Particularly with the presence of a plurality of support feet, they can preferably be designed to be separated from one another, thereby making it possible to save on material in the production of a fastening device according to the invention.

A particularly easy design form of a fastening device according to the invention having a low weight can be provided in this way.

There can also be further provision in a fastening device according to the invention that the supporting portion is X-shaped transversely to the clamping direction. Such an X-shaped design can particularly preferably be combined with the fact that the supporting portion has a plurality of, in particular four, support feet which form the respective arms of the X-shaped supporting portion. In this design form, too, the supporting portion can be constructed with saving of material and thus be formed with a low weight.

With particular preference, a fastening device according to the invention can also be characterized in that the clamping portion and the supporting portion are formed in one piece, in particular are produced monolithically. This makes possible particularly simple provision of a mechanically fixed connection between the clamping portion and the supporting portion. A one-piece design of the clamping portion and the supporting portion means that they are automatically fixedly connected to one another and do not have to be subsequently arranged on one another and connected. In particular, the clamping portion and the supporting portion can also be produced integrally, in particular can be produced monolithically. Particularly quick and simple production of a fastening device according to the invention can thus be provided.

According to a second aspect of the invention, the object is achieved by a lamp unit for a vehicle having a lamp body and a fastening device for fastening the lamp unit to a body portion of the vehicle. A lamp unit according to the invention is characterized in that the fastening device is designed according to the first aspect of the invention. All advantages which have been described comprehensively with respect to a fastening device according to the invention according to the first aspect of the invention can thus also be provided by a lamp unit for a vehicle which has such a fastening device according to the first aspect of the invention.

With particular preference, there can be provision in a lamp unit according to the invention that the fastening device is premounted on the lamp body before mounting the lamp unit in the vehicle. Particularly simple and in particular quick final mounting of the lamp unit on the vehicle can be provided in this way. During this final mounting, it is possible for example for the lamp unit with the premounted fastening device to be inserted from outside through an opening in the body portion of the vehicle. During this insertion, the supporting portion of the fastening device according to the invention is easily elastically deformed and, after conclusion of the insertion, preferably snaps back into a supporting position in which there is made possible clamping of the body portion in between a part of the lamp body which is still situated outside the vehicle and the supporting portion which is now situated within the vehicle on the body portion. The final mounting of the lamp unit on the vehicle can be concluded by generating the clamping force, for example by tightening a clamping nut.

A lamp unit according to the invention can also be designed to the effect that the lamp body has a counter-clamping receptacle for receiving the clamping means of the fastening device, wherein in particular the counter-clamping receptacle takes the form of an opening having an internal thread adapted to a clamping screw. In this particularly preferred design form of a lamp unit according to the invention, the clamping means of the fastening device can be arranged in the counter-clamping receptacle of the lamp body. In particular, it is possible for example for a clamping screw to be screwed into an internal thread of the counter-clamping receptacle and thus for the entire fastening device to be fastened to the lamp body of the lamp unit. Tightening a clamping nut which is preferably supported on a supporting surface of the clamping portion of the fastening device makes it possible to provide particularly simple, reliable and nevertheless adjustable generation of the clamping force.

A lamp unit according to the invention can also be further developed to the effect that the counter-clamping receptacle is arranged on the lamp body so as to be adapted to a center of gravity of the lamp unit. Adapted within the context of the invention can mean in particular that the counter-clamping receptacle is arranged at the center of gravity of the lamp unit or at least in the vicinity of the center of gravity of the lamp unit. A particularly uniform distribution of the clamping force over the supporting portion and thus over the entire lamp unit can be provided in this way. Force peaks when clamping the lamp unit with the body portion and in particular regions with reduced or even without clamping force can be avoided in this way.

A further development of a lamp unit according to the invention can be characterized in that the center of gravity of the lamp unit takes the form of a linear center of gravity of a sealing element of the lamp unit. The sealing element of the lamp unit can be arranged in particular on the lamp body in such a way that, upon generation of the clamping force, and thus upon fastening the lamp unit to the vehicle, said sealing element is clamped in between the lamp body and the body portion of the vehicle. A center of gravity which takes the form of a linear center of gravity of the sealing element makes it possible to provide a situation in which the sealing element is clamped uniformly or at least substantially uniformly over the entire periphery of the lamp unit between the lamp body and the body portion of the vehicle. Particularly good sealing of the lamp unit or of the opening in the body portion of the vehicle that is covered by the lamp unit can be provided in this way.

There can further be provision in a lamp unit according to the invention that the lamp body has at least one guiding element for guiding, in particular for positively guiding, a counter-guiding element of the fastening device. This makes it possible for example to avoid tilting and/or jamming of the fastening device on the lamp body of the lamp unit. In particular, the counter-guiding element of the fastening device can preferably be guided by the guiding element of the lamp body in the direction of the clamping direction. For example with a premounted fastening device on the lamp body, it is possible in this way, when mounting the lamp unit on the vehicle, to reliably avoid an unwanted change in a relative position of the fastening device with respect to the lamp body.

According to a particularly preferred design form of a lamp unit according to the invention, there can further be provision that the lamp unit takes the form of a tail lamp. Such a tail lamp can combine, for example, rear lights, brake lights, direction indicators and/or further light elements. Tail lamps also constitute lamp units of a vehicle which, particularly due to their vicinity to the luggage compartment of the vehicle, are often subject to a high degree of limitation in the available installation space. A configuration of a tail lamp as a light unit according to the invention which is fastened to the vehicle in particular by means of a fastening device according to the invention allows construction freedom when planning such a lamp unit designed as a tail lamp to be increased.

According to a third aspect of the invention, the object is achieved by a vehicle having a lamp unit. A vehicle according to the invention is characterized in that the lamp unit is designed according to the second aspect of the invention. A lamp unit according to the second aspect of the invention in particular has a fastening device according to the first aspect of the invention. All advantages which have been comprehensively described with respect to a lamp unit according to the second aspect of the invention or with respect to a fastening device according to the first aspect of the invention can thus also be provided by a vehicle which has such a lamp unit according to the second aspect of the invention having a fastening device according to the first aspect of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
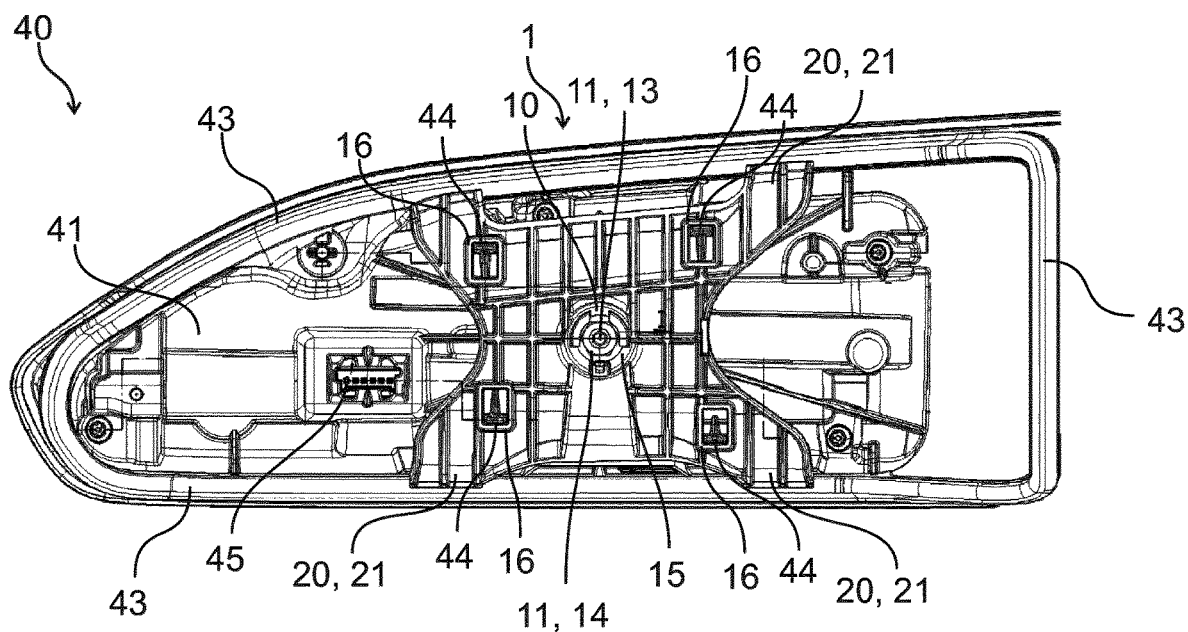
FIG. 1 schematically shows a lamp unit according to an embodiment of the invention in a plan view.
Figure 2:
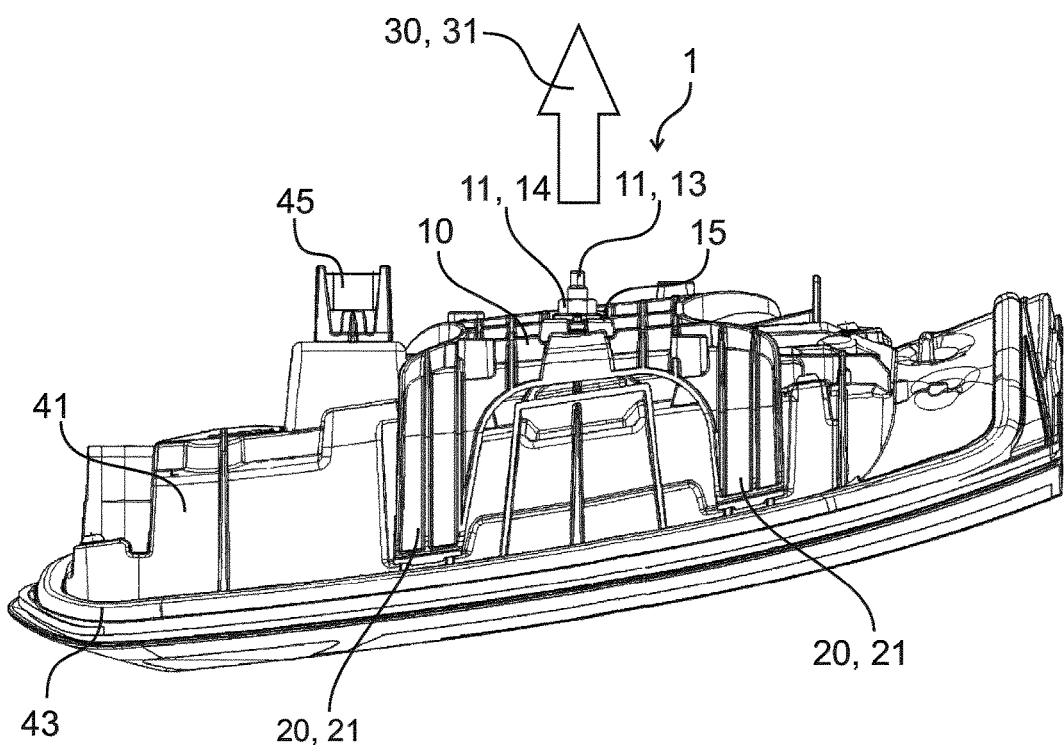
FIG. 2 shows a lamp unit in a side view.
Figure 3:
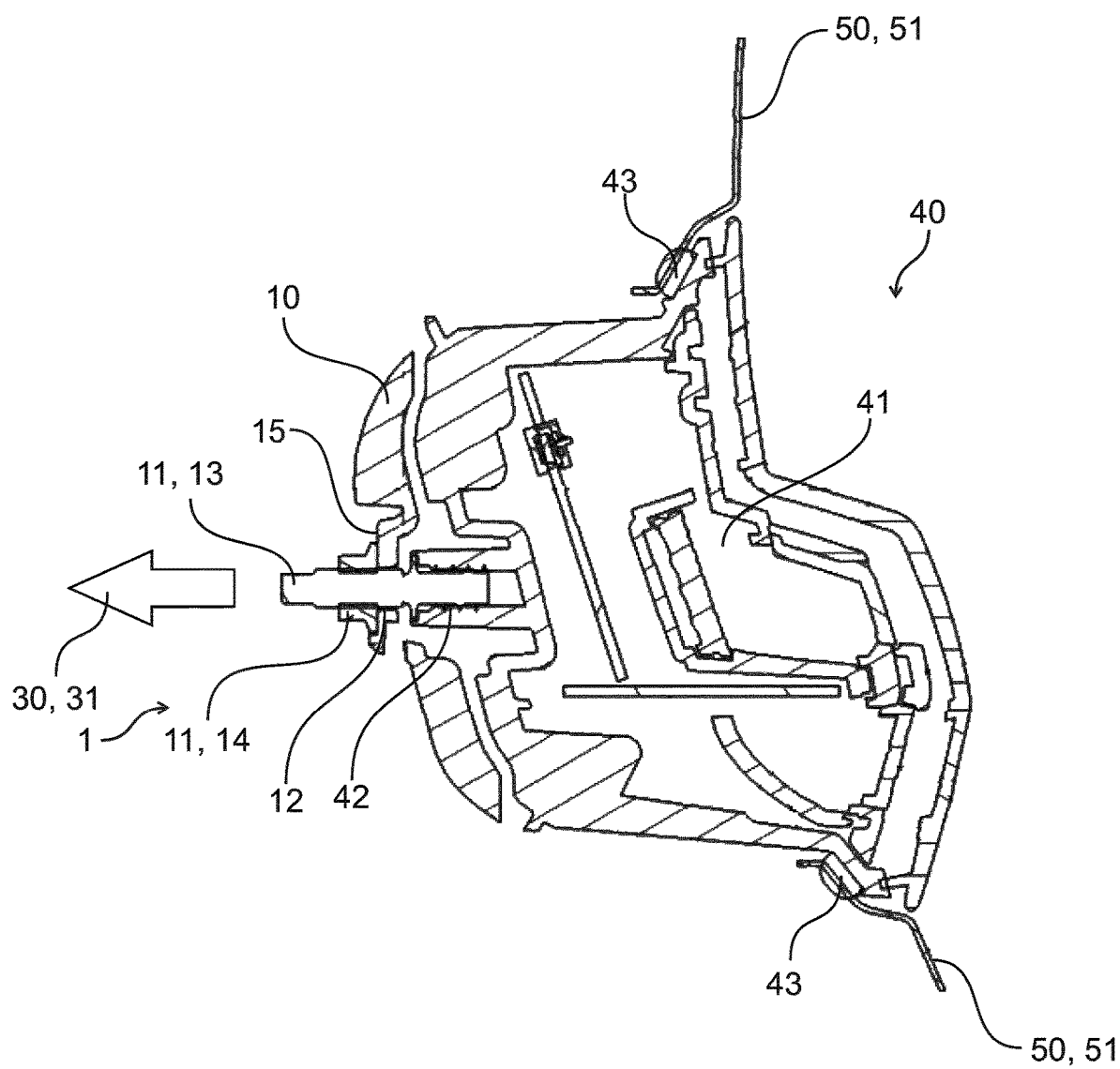
FIG. 3 shows a lamp unit in a sectional illustration.

FIGS. 1 to 3 show a design form of a lamp unit 40 in different views. In the following, FIGS. 1 to 3 are therefore described jointly, with each of the individual figures being specifically discussed.

A lamp unit 40, as is shown in FIGS. 1 to 3, is provided in particular for use in a vehicle 50 (not depicted in these figures), with clamping of the lamp unit 40 on the body portion 51 of the vehicle 50 being able to be provided by means of a fastening device 1 according to the invention; see in particular FIG. 3. A clamping portion 10 of the fastening device 1 generates a clamping force 30 in a clamping direction 31, which clamping force is dissipated via a supporting portion 20 connected fixedly to the clamping portion 10 and can be used to clamp the lamp unit 40 on the body portion 51. A central or at least substantially central arrangement of the clamping portion 10 with respect to the remainder of the fastening device 1, visible in particular in FIG. 1, makes it possible to achieve a particularly uniform distribution of the generated clamping force 30 and thus a particularly secure clamping of the lamp unit 40 on the body portion 51. It is clearly visible particularly in FIG. 3 that the clamping portion 10 has in particular a clamping means 11 which is arranged in a clamping receptacle 12 and which can take the form of a clamping screw 13 having a clamping nut 14. With particular preference, a counter-clamping receptacle 42 can be present in the lamp body 41 of the lamp unit 40 and is particularly preferably designed with an internal thread for receiving the clamping screw 13. Tightening the clamping nut 14 which is supported in particular on a supporting surface 15 allows the clamping force 30 to be generated in a particularly simple, reliable and in particular adjustable manner. The supporting portion 20 which, as illustrated in FIG. 1 preferably extends in an X shape starting from the clamping portion 10 and is mechanically fixedly connected thereto, preferably by means of a one-piece design, preferably has support feet 21, in particular four support feet 21, which are designed for engaging laterally around the lamp body 41. This is particularly clearly visible in FIG. 2. The generated clamping force 30 is dissipated via the supporting portion 20, in particular the support feet 21, and the body portion 51 is clamped between the supporting portion 20 and the lamp body 41. A secure arrangement and fastening of the entire lamp unit 40 on the body portion 51 of the vehicle 50 can be provided in this way. With particular preference, as illustrated, a sealing element 43 can be arranged on the lamp body 41, this sealing element 43 preferably being situated at the point where the clamping of the lamp body 41 on the body portion 51 occurs. It is possible in this way for an opening which is formed by the body portion 51 and which is provided for receiving the lamp unit 40 to be sealed well and particularly securely. This can further be assisted by virtue of the fact that the counter-clamping receptacle 42, and hence in particular the arrangement of the clamping means 11, is arranged at a center of gravity, preferably a linear center of gravity of the sealing element 43. Particularly uniform dissipation of the clamping force 30 and thus particularly good sealing provided in particular along a periphery of the sealing element 43 can be ensured in this way. As illustrated, the fastening device 1 can also be already premounted on the lamp body 41 of the lamp unit 40. In order to prevent jamming and/or tilting of the fastening device 1 with respect to the lamp body 41, there can be provided one or more counter-guiding elements 16 on the fastening device 1 and guiding elements 44 on the lamp body 41. Overall, it is possible by using a fastening device 1 according to the invention, and thus by virtue of pure clamping of the lamp unit 40, in particular clamping of the body portion 51 between the supporting portion 20 of the fastening device 1 and the lamp body 41 of the lamp unit 40, to provide fastening of the lamp unit 40 to the vehicle 50 in a particularly secure and at the same time flexibly providable manner. Further fastening means, for example screw connections, can be avoided in this way.

Figure 4:
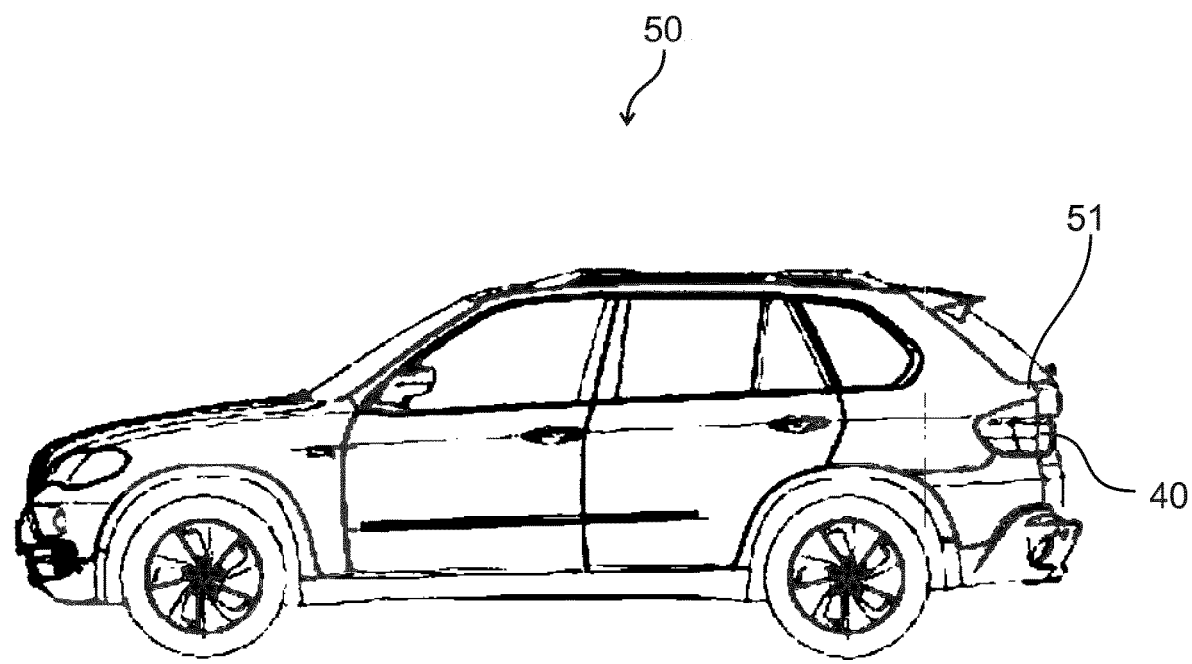
FIG. 4 shows a vehicle having a lamp unit.

FIG. 4 shows a vehicle 50 which has the lamp unit 40. The lamp unit 40 particularly takes the form of a tail lamp. A fastening device 1 (not depicted in this figure) according to the invention can particularly provide that the lamp unit 40 can be clamped on the corresponding body portion 51 of the vehicle 50. Complicated fastening means, in particular screw connections, which, on the one hand, have a non-negligible installation space requirement and, on the other hand, can be structurally limiting, can be avoided in this way.

LIST OF REFERENCE SIGNS 1 fastening device
10 clamping portion
11 clamping means
12 clamping receptacle
13 clamping screw
14 clamping nut
15 supporting surface
16 counter-guiding element
20 supporting portion
21 support foot
30 clamping force
31 clamping direction
40 lamp unit
41 lamp body
42 counter-clamping receptacle
43 sealing element
44 guiding element
45 plug receptacle
50 vehicle
51 body portion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening device for a lamp unit of a vehicle, wherein the lamp unit is fastenable to a body portion of the vehicle by the fastening device, comprising:
a clamp configured to generate a clamping force in a clamping direction between a lamp body of the lamp unit and the body portion; and
a support plate which is mechanically fixedly connected to the clamp and is configured to clamp the body portion of the vehicle between the lamp body and the fastening device by way of a generated clamping force, wherein
starting from the clamp, the support plate extends radially outward in four different directions so as to define an x-shape.

2. The fastening device according to claim 1, wherein the clamp has a clamping device and a clamping receptacle for receiving the clamping device for generating the clamping force.

3. The fastening device according to claim 2, wherein the clamping device is a clamping screw having a clamping nut, and
the clamp has a supporting surface for the clamping nut arranged on the clamping screw.

4. The fastening device according to claim 1, wherein the clamp is arranged centrally or at least substantially centrally in the fastening device.

5. The fastening device according to claim 1, wherein the support plate has, along or at least substantially along the clamping direction, at least one support foot for engaging laterally around the lamp body.

6. The fastening device according to claim 5, wherein the support plate defines four support feet.

7. The fastening device according to claim 1, wherein the X shape of the support plate is transversely to the clamping direction.

8. The fastening device according to claim 1, wherein the clamp and the support plate are formed in one piece.

9. The fastening device according to claim 1, wherein the clamp is removable from the supporting portion.

10. A lamp unit for a vehicle, comprising:
a lamp body; and
a fastening device for fastening the lamp unit to a body portion of the vehicle, wherein
the fastening device comprises a clamp for generating a clamping force in a clamping direction between a lamp body of the lamp unit and the body portion; and
a support plate which is mechanically fixedly connected to the clamping portion and configured for clamping the body portion of the vehicle between the lamp body and the fastening device by way of a generated clamping force, wherein
starting from the clamp, the support plate extends radially outward in four different directions so as to define an x-shape.

11. The lamp unit according to claim 10, wherein the fastening device is premounted on the lamp body before mounting the lamp unit in the vehicle.

12. The lamp unit according to claim 10, wherein
the lamp body has a counter-clamping receptacle for receiving the clamping device of the fastening device.

13. The lamp unit according to claim 12, wherein
the counter-clamping receptacle is an opening having an internal thread adapted to a clamping screw of the clamping device.

14. The lamp unit according to claim 13, wherein
the counter-clamping receptacle is arranged on the lamp body so as to be adapted to a center of gravity of the lamp unit.

15. The lamp unit according to claim 14, wherein
the center of gravity of the lamp unit takes the form of a linear center of gravity of a sealing element of the lamp unit.

16. The lamp unit according to claim 10, wherein
the lamp body has at least one guiding element for positively guiding a counter-guiding element of the fastening device.

17. The lamp unit according to claim 10, wherein
the lamp unit is a tail lamp.

18. A vehicle comprising a lamp unit according to claim 10.

19. The lamp unit according to claim 10, wherein the clamp is removable from the supporting portion.

* * * * *